United States Patent [19]

Niebauer et al.

[11] Patent Number: 5,032,050

[45] Date of Patent: Jul. 16, 1991

[54] ON-EDGE CUTTING INSERT WITH CHIP CONTROL

[75] Inventors: Kenneth L. Niebauer; Thomas A. Lockard, both of Raleigh, N.C.

[73] Assignee: Kennametal Inc., Latrobe, Pa.

[21] Appl. No.: 599,213

[22] Filed: Oct. 16, 1990

Related U.S. Application Data

[60] Continuation-in-part of Ser. No. 329,146, Mar. 27, 1989, Pat. No. 4,963,060, which is a division of Ser. No. 93,348, Sep. 4, 1987, Pat. No. 4,834,592, and a continuation of Ser. No. 582,458, Sep. 13, 1990, and a continuation of Ser. No. 581,813, Sep. 13, 1990.

[51] Int. Cl.⁵ .............................................. B23P 15/28
[52] U.S. Cl. ...................................... 407/114; 407/117
[58] Field of Search ............... 407/114, 113, 115, 116, 407/117, 100, 107

[56] References Cited

U.S. PATENT DOCUMENTS

| | | | |
|---|---|---|---|
| 2,679,679 | 6/1954 | Metzler | 29/95 |
| 3,399,442 | 9/1968 | Jones et al. | 29/95 |
| 3,557,416 | 1/1971 | Jones | 29/95 |
| 3,754,309 | 8/1973 | Jones et al. | 29/96 R |
| 3,762,005 | 10/1973 | Erkfritz | 29/95 R |
| 3,940,835 | 3/1976 | Friedline et al. | 29/105 R |
| 4,011,050 | 3/1977 | Zinner | 407/117 |
| 4,116,576 | 9/1978 | Gawryk, Sr. | 407/114 |
| 4,357,123 | 11/1982 | Zweekly | 407/110 |
| 4,360,297 | 11/1982 | Weber | 407/113 |
| 4,558,974 | 12/1985 | Pano | 407/117 |
| 4,626,141 | 12/1986 | Malaker et al. | 407/114 |
| 4,669,925 | 6/1987 | Lowe et al. | 407/114 |
| 4,674,924 | 6/1987 | Carlsson et al. | 407/114 |
| 4,681,487 | 7/1987 | Pettersson | 407/114 |
| 4,755,085 | 7/1988 | Muren et al. | 407/113 |
| 4,755,086 | 5/1988 | Stashko | 407/114 |
| 4,778,311 | 10/1988 | Niemi | 407/117 |
| 4,834,592 | 5/1989 | Niebauer et al. | 407/114 |
| 4,854,784 | 8/1989 | Murray et al. | 407/114 |
| 4,909,677 | 3/1990 | Noguchi et al. | 407/66 |
| 4,957,396 | 9/1990 | Niebauer | 407/114 |
| 4,963,060 | 10/1990 | Niebauer | 407/114 |
| 4,969,779 | 11/1990 | Barten | 407/114 |

FOREIGN PATENT DOCUMENTS

| | | | |
|---|---|---|---|
| 0088426 | 9/1983 | European Pat. Off. | 407/117 |
| 112806 | 4/1984 | European Pat. Off. | |
| 2238888 | 8/1975 | Fed. Rep. of Germany | 407/117 |
| 1127695 | 12/1984 | U.S.S.R. | 407/117 |
| 672039 | 3/1951 | United Kingdom | |
| 1363542 | 5/1971 | United Kingdom | |
| 89/01836 | 3/1989 | World Int. Prop. O. | |

OTHER PUBLICATIONS

Sandvik, "Coromant Metalworking Products," pp. 20–21, 116, 118–119.
Iscar, "Cut-Grip Inserts," p. 11.
Econ-O-Groove, p. 63.

*Primary Examiner*—Frederick R. Schmidt
*Assistant Examiner*—Blynn Shideler
*Attorney, Agent, or Firm*—James G. Porcelli; Thomas R. Trempus

[57] ABSTRACT

An improved on-edge cutting insert with chip control features and a method for manufacturing the same. An insert body having peripheral end wall regions, sides and first and second walls has cutting edges and is adapted for mounting in a pocket of a toolholder assembly. A land region extends rearwardly from the end wall region and defines a surface region of a predetermined width. A descending wall initiates in a portion of the land and terminates in a planar floor region having a forward, a rearward and opposed side edges. A back ramp extends upwardly from the planar floor rearward edge and terminates at the respective top or bottom wall. The end wall region can include at least one flat land region adjacent the land region. The flat land region defines a selectively removable portion of the end wall region and after my selective removal thereof represents no more than approximately one-third of the total eidth of the end wall region.

22 Claims, 7 Drawing Sheets

ON-EDGE CUTTING INSERT WITH CHIP CONTROL

This is a continuation-in-part of copending application Ser. No. 07/329,146, filed on Mar. 27, 1989, now U.S. Pat No. 4,963,060 which is a divisional application of parent application Ser. No. 07/093,348, filed on Sept. 4, 1987, and issued on May 30, 1989, as U.S. Pat. No. 4,834,592, entitled "Cutting Insert with Chip Control." There are two other copending applications relating back to the parent application. They are continuation application Ser. No. 07/582,458, filed Sept. 13, 1990 (Kennametal Case K-0863C1) and continuation application Ser. No. 07/581,813, filed Sept. 13, 1990 (Kennametal Case K-0863C2), both entitled "Cutting Insert with Chip Control."

FIELD OF THE INVENTION

The invention is directed to cutting inserts, especially metal cutting inserts with chip control. The invention also provides a method for the manufacture of such cutting inserts.

BACKGROUND OF THE INVENTION

Cutting inserts are well known and a large percentage of them are of the throw away design. Such inserts are detachably clamped on a holder and then are discarded when they become dull or chipped. Throw away inserts are usually indexable and often are reversible so that an insert can be provided with at least two cutting edges for selective presentation to the cutting position.

The provision of two or more cutting edges on the insert makes it economical to use and is particularly important with respect to throw away inserts because of the high cost of the materials from which the inserts are produced, especially when the material is, for example, a cemented metal carbide.

The inserts must be securely and accurately held in place within an insert holder during the cutting operation. This is especially true when the inserts are employed with numerically controlled machines which depend for accuracy upon an accurately located and firmly supported insert. When the inserts are of a substantial area, it is possible to fix the insert both accurately and firmly within the pocket of a toolholder by providing the insert with a central hole and the toolholder with a pin-type clamping device. In other cases, such inserts may be held in place by a top clamp. Examples of such holders are found in U.S. Pat. No. 3,754,309; 3,399,442 and 3,762,005 and British Patent Specification 1,363,542.

The main object of metal machining is the shaping of the new work surface. Much attention is paid to the formation of the chip during the machining process, even though the chip is a waste product. This is because the consumption of energy occurs mainly in the formation and movement of the chip. Thus an essential feature of any metalcutting operation is effective chip control. A principal class of chips is the discontinuous chip which has the practical advantage of being easily cleared from the cutting area. While some metals and alloys generate discontinuous chips during cutting operations, many do not. It is therefore very desirable to produce discontinuous chips during a cutting operation, regardless of the metal or alloy of the workpiece.

It has been a common practice to place a mechanical chip breaking member between the insert and the clamp securing the insert to the tool in order to provide at least a degree of chip control during the cutting operation. This arrangement presents the obvious drawback of increasing the effective area necessary for metal cutting operations with a given tool.

Because chip control is an important consideration in metal cutting operations, it has been a long standing objective in the art of metal cutting to develop improved chip breaking members for use with tools as well as improved designs for the cutting inserts. One example of a cutting insert with chip breaking capabilities is the cut-grip inserts "GIP" available from ISCAR. The ISCAR insert has a land with a pair of generally parallel, elongated and elevated members which deform the metal chips as they are removed from the workpiece. Another example of a cutting insert with features designed to provide chip control is the Econ-o-grove insert manufactured by Valenite Corporation. This insert has parallel side walls extending along a continuous descending wall, floor and back wall of constant radius. Another example of a cutting insert with a chipbreaker style is commercially available from Sandvik and is characterized by a non-continuous front face which may not provide a flat finish to the cut groove in a workpiece.

It is an object of the invention to provide an insert with improved chip control characteristics.

It is another object of this invention to provide a method of manufacturing an insert with improved chip control.

It is another object of this invention to provide an improved chip control insert configured to cooperate with a clamping element of an insert toolholder.

SUMMARY OF THE INVENTION

The invention provides a cutting insert with a unique configuration that results in improved chip control. The improved cutting insert with chip control features comprises an insert body having cutting edge regions and sides and at least two peripheral walls substantially perpendicular to the sides. The insert body is adapted for mounting in a holder with one cutting edge region exposed. The insert body is invertible or indexable about an axis perpendicular to the sides thereof and the insert body has cutting edges at the cutting edge regions, whereby in each inverted or indexed position of the insert body a respective cutting edge is presented uppermost at the same end of the insert body.

The peripheral walls or seating surfaces of the insert body may define therein a diagonal notch, which extends thereacross at an angle such that each notch when uppermost forms substantially the same angle with the sides of the insert.

Each of the cutting edge regions of the insert defines at least in part a cutting edge for presentation to a workpiece. A land region extends rearwardly from the cutting edge region toward the respective peripheral wall and defines a surface region of a predetermined width and area. A descending wall initiates in a portion of the land and terminates in a planar floor region having a forward, a rearward and opposed side edges. The descending wall terminates at the forward and opposed side edges of the planar floor and a back ramp extends upwardly from the planar floor reward edge and terminates at the respective peripheral wall.

In an alternative embodiment, the land, descending walls, back ramp and planar floor define a region which can be asymmetrically disposed in the cutting edge region and the cutting edge region also includes at least one flat land region. With this configuration, an improved method of manufacturing inserts is made possible. The flat land region or the insert body cutting edge region preferably defines at least in part a selectively disposable portion of the cutting edge region. As a result, the overall width of the cutting edge region is reducible by the selective removal of at least a portion of the disposable portion.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 1:
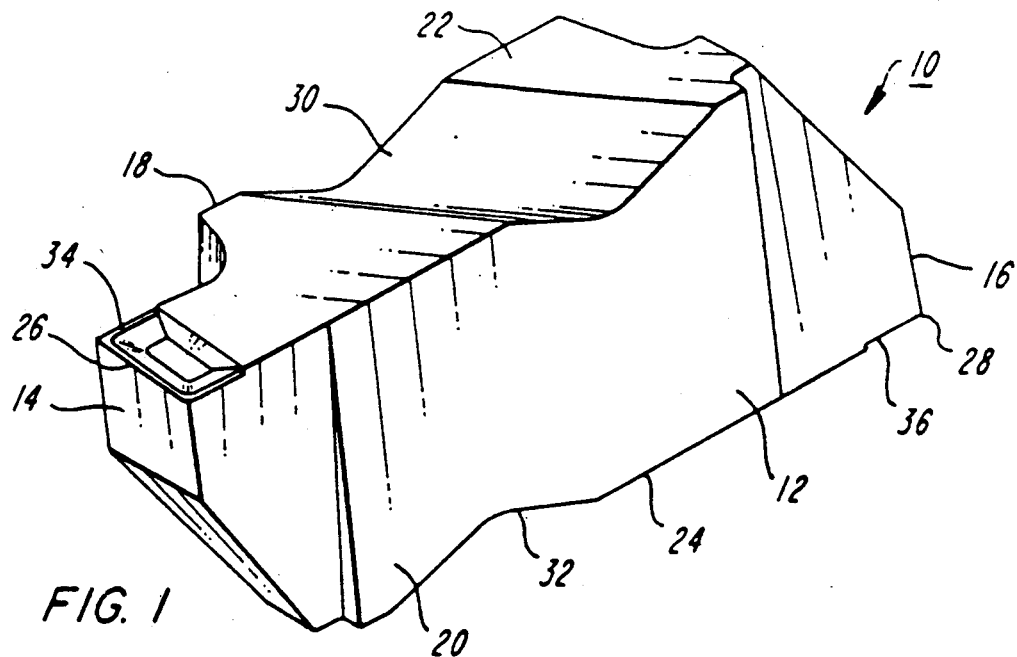
FIG. 1 is an isometric view of a cutting insert configured for chip control, all according to the present invention.

An improved cutting insert with chip control features is isometrically shown in FIG. 1 and generally indicated by the reference character 10. The insert 10 comprises an insert body 12 having a first flank or end wall 14, a second opposed flank or end wall 16, first and second sides 18 and 20 and first and second seating surfaces or peripheral walls 22 and 24. The insert body 12 is preferably made from a hard cemented carbide such as tungsten or titanium carbide or tungsten titanium carbide or TiC-TiN. At the juncture of one end wall 14 and the first peripheral wall 22 there is one cutting edge 26. At the juncture of the other end wall 16 and the second peripheral wall 24 there is a second cutting edge 28.

The insert body 12 of the insert 10 may be formed with a diagonal groove 30 in the first wall 22 and a diagonal groove 32 in the second wall 24 of the insert. Each groove 30 and 32 is preferably "V" shaped in cross section and adapted for engagement by the toolholder assembly which will be described below. With the insert configuration as described above, in each inverted or indexed position of the insert body 12, a respective cutting edge is presented uppermost at the same end of the insert body. The diagonal notch or grooves 30 and 32 extending across the insert body are disposed at an angle such that each notch, when uppermost, forms substantially the same angle with the sides 18 and 20 of the insert body 12. Also, in each inverted or indexed position, the insert body 12 presents a cutting edge region of the insert defining at least in part the cutting edge 26 or 28 to a workpiece.

Figure 3:
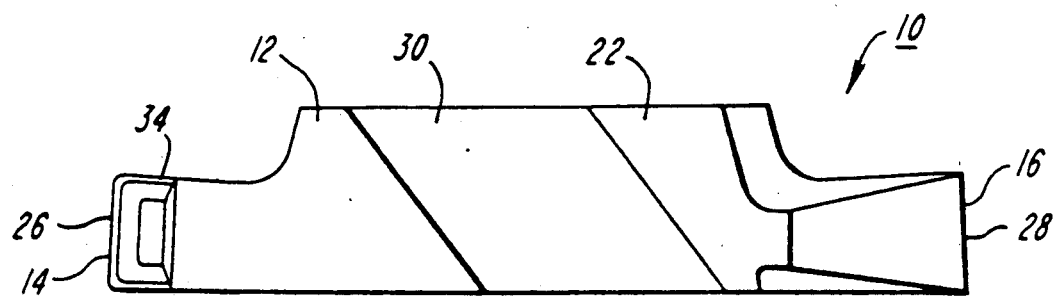
FIG. 3 is a plan view of a cutting insert of this invention shown in FIG. 1.
Figure 4:
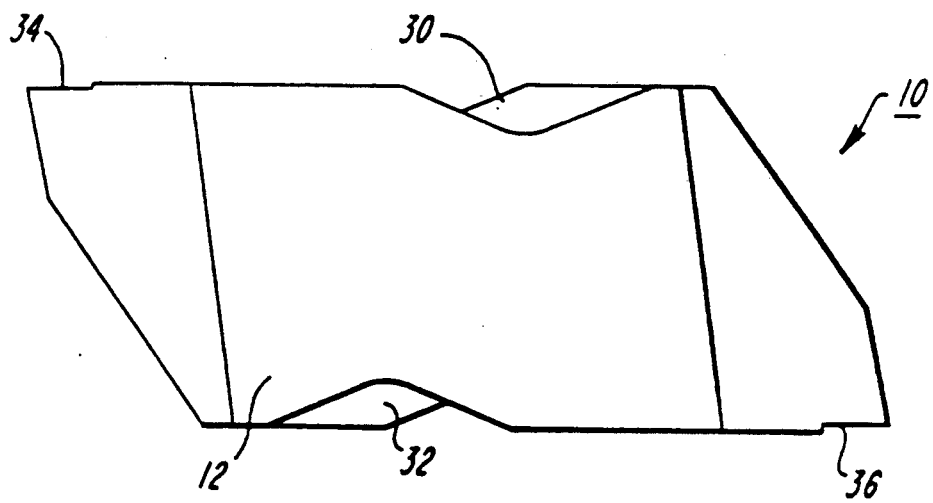
FIG. 4, is a side view of an insert of this invention shown in FIG. 1.
Figure 5:
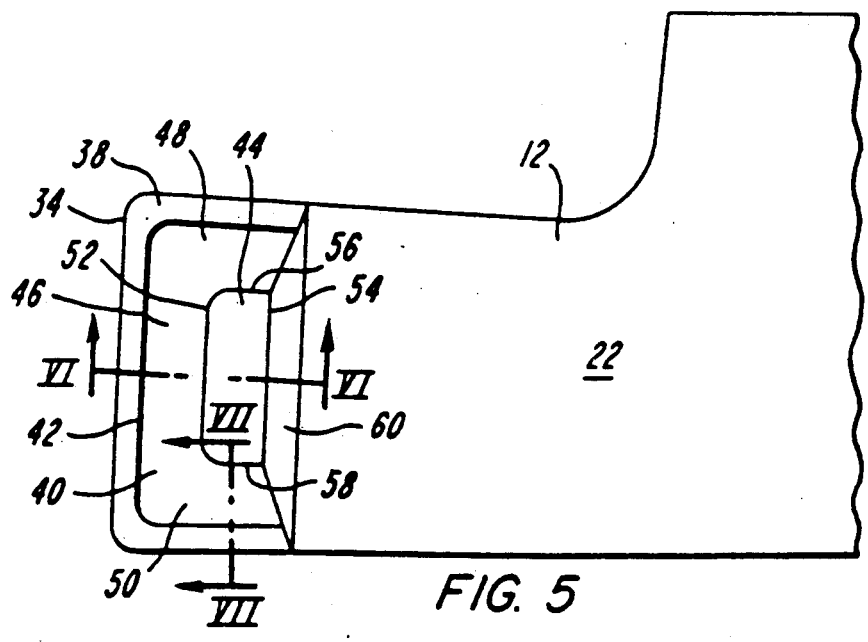
FIG. 5 is a an enlarged fragment plan view illustrating the cutting edge region of the insert of FIG. 1.

As can be seen more clearly through consideration of FIGS. 3, 4 and 5, in conjunction with FIG. 1, the insert body 12 includes at each cutting edge region thereof, a land region 34 and 36 extending rearwardly from the respective end wall 14 region and end wall 16 region toward the respective first or second wall 22 and 24. Each land region defines a surface region 38 of a predetermined width and area. It is to be appreciated that the insert 10 of this invention is reversible or indexable, and therefore the detailed features described in conjunction with one side or cutting edge region of the insert are present in the other side or cutting edge region thereof. Considering the end wall 14 region, a descending wall 40 initiates at an edge 42 of the land 34 and terminates in a planar floor region 44. The descending wall 40 has a forward portion 46 and opposed side portions 48 and 50. The planar floor region 44 has a forward edge 52, a rearward edge 54 and opposed side edges 56 and 58. The descending wall 40 terminates at the planar floors forward edge 52 and opposed side edges 56 and 58. A back ramp 60 extends upwardly from the planar floor rearward edge 54 and terminates at the first wall 22.

The back ramp 60 ascends from the rearward edge 54 of the planar floor 44 toward the first wall 22 at an angle of approximately 30 to 50 degrees and, preferably, 40 degrees relative to the first wall 22.

Figure 6:
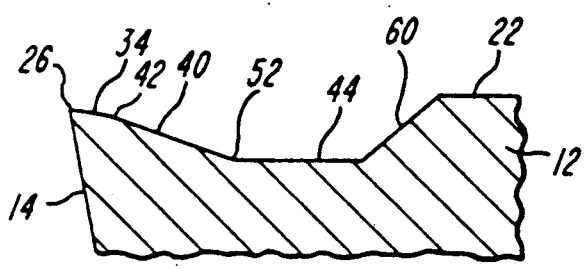
FIG. 6 is a section along lines VI-VI of FIG. 5.

As can be seen in FIG. 6, the descending wall 40 portion proximate the forward edge 52 of the planar floor 44 descends toward the floor 44 at an angle of approximately 15 to 21 degrees and, preferably, 18 degrees with respect to the planar floor 44. The land region 34 proximate the cutting edge 26 slopes downwardly toward the descending wall juncture 42 at an angle of approximately between about 5 to 15 degrees, preferably, 8 to 12 degrees, and more specifically about 10 degrees with respect to the first wall 22 of the insert body 12. The cutting edge 26 may be of a lesser elevation than the first wall 22.

Figure 7:
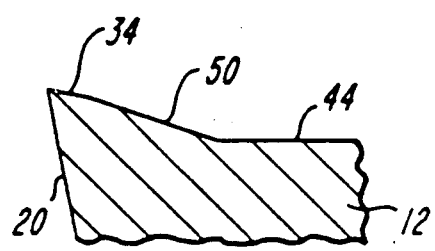
FIG. 7 is a section along lines VII-VII of FIG. 5.

As can be seen in FIG. 7, the side wall 50 of the descending wall 40, descends from the land 34 toward the planar floor 44 at an angle of between about 15 to 21 degrees and, preferably at an angle of about 18 degrees with respect to the planar floor 44. Generally the side wall has an angle with a slope selected to facilitate the pressing operation of the manufacturing process.

It has been found when cutting metal with the insert of the present invention that a chip coming off a workpiece in a light feed comes off the land area of the insert and strikes the ramp 60 wherein breakage is caused by the force of the chip's impact with either the back ramp or the chip itself as the chip is directed back toward the workpiece. In a heavier feed rate, breakage appears to be the result of a combination of the chip striking the floor 44 and the back ramp 60 as well as the chip turning back in on itself. The chip coming from the workpiece forms a generally "U" shaped cross section as a result of the chip control feature of the insert 10.

While as shown in FIG. 7, the land region 34 disposed between the side 20 and the descending side wall 48 descends toward the descending side wall 50 (not shown) at a slight angle, it is believed that the lack of such a descending angle would not adversely impact chip control. However, this descending angle is believed to contribute to a reduction in cutting forces and thus is a preferable feature.

Figure 2:
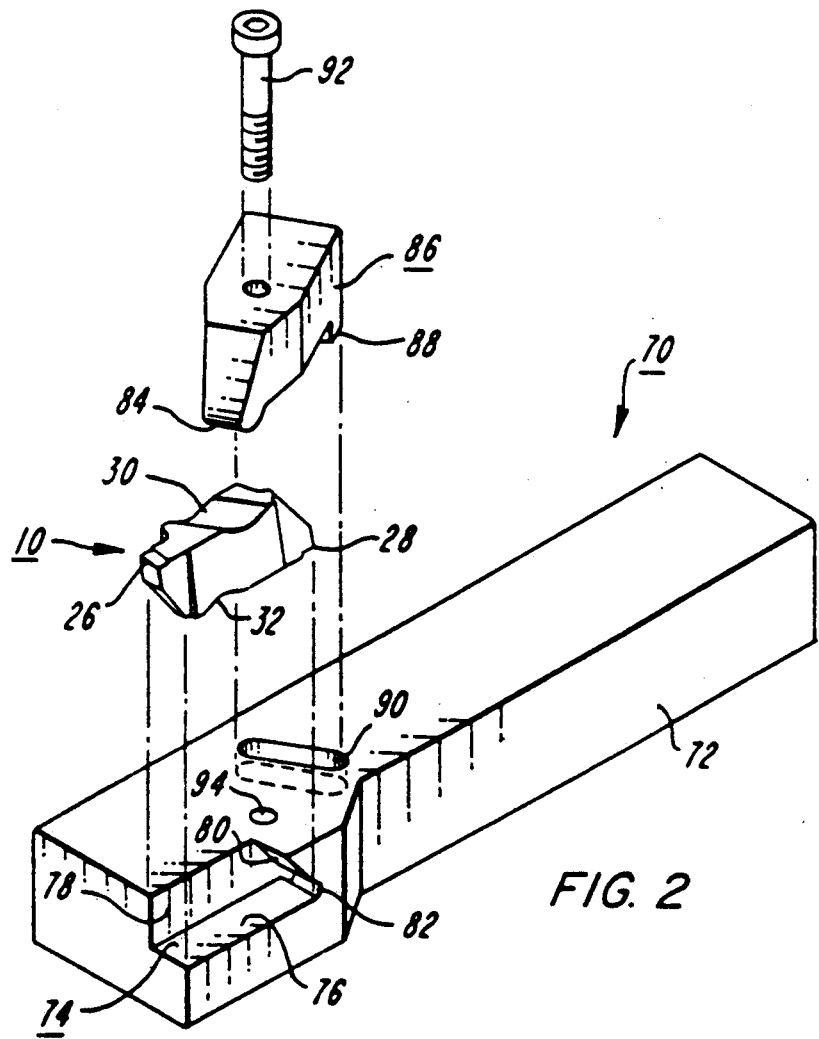
FIG. 2 is an exploded perspective view illustrating a typical holder and clamping arrangement for use in combination with one cutting insert of this invention.

Turning now to FIG. 2, there is shown a toolholder 70 which is ideally suited for use in combination with the insert 10 of this invention. The toolholder 70 is in the form of a bar-like steel member 72 adapted for being clamped in a tool support of any suitable type. At one end of the member 72 there is an insert pocket 74 having a bottom wall 76, a side wall 78 and a back wall 80. Advantageously, an undercut is provided at the juncture of the bottom and back walls as indicated at 82 in order to protect the cutting edge 26, 28 of the insert 10 which is disposed in that region in each clamped position of the insert 10.

It will be noted that bottom and side walls 76 and 78 of the pocket are at right angles to each other whereas back wall 80 may be at a right angle to side wall 78 but converges with bottom wall 76 in the direction toward the back of the pocket. This pocket 74 is adapted for receiving an insert 10 therein. As described above, the insert 10 may be provided with "V" shaped notches or grooves 30 and 32. These grooves 30 and 32 are adapted for engagement by the rounded nose 84 on the one end of one leg of a clamp member 86 which is in the form of an inverted "U" shaped member.

Clamping member 86 has a further leg 88 adapted for being received in a recess 90 formed in the top of the holder 70. A clamp screw 92 extends through a hole in the clamp member 86 between the legs thereof and into a threaded hole 94 provided in the top wall of the holder.

When the insert is placed in the pocket, the clamp member is put in position, and screw 92 is tightened up, and the insert is pressed firmly against the bottom wall 76 of the pocket while simultaneously being drawn toward walls 78 and 80. The insert is thus fixedly clamped in the pocket in the holder and is accurately located therein by being forced against the side walls of the pocket.

The side wall 78 of the pocket is preferably at a slight angle, approximately about 3 degrees, to the longitudinal axis of the holder 70. For this reason, the opposite ends of the insert are shaped in such a manner as to compensate for the small angularity of the wall 78 to the longitudinal axis of the holder 70.

A more detailed description of this as well as several other clamping arrangements and toolholders which can be advantageously utilized with the subject cutting insert can be had through a review of U.S. Pat. No. 3,754,309, entitled "Cutting Insert and Clamping Arrangement Therefor," which patent is assigned to the assignee of the present invention and incorporated by reference herein.

Figure 8:
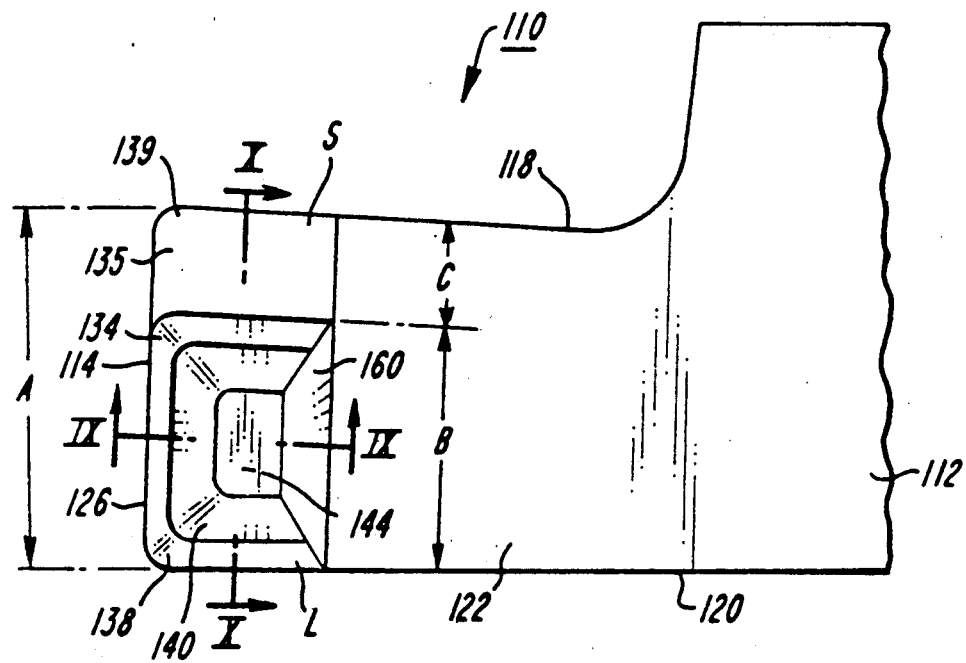
FIG. 8 is an enlarged fragment plan view illustrating the cutting edge region of an insert of this invention, which insert has an enlarged and extended land which can be selectively removed to provide inserts of a variety of sizes, all accordingly to a process of this invention.
Figure 9:
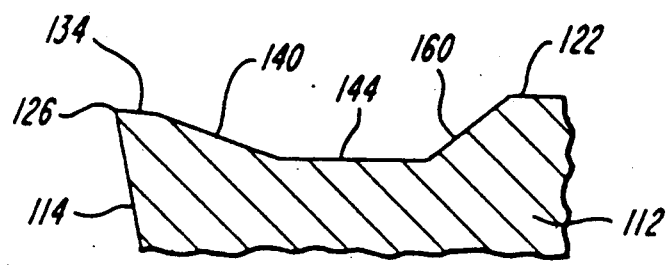
FIG. 9 is a section along lines IX-IX of FIG. 8.
Figure 10:
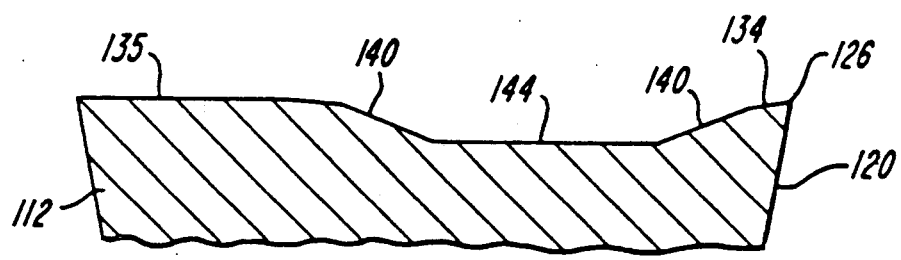
FIG. 10 is a section along lines X-X of FIG. 8.

The present invention is also directed to an improved method for manufacturing a cutting insert with chip control features. Turning to FIGS. 8, 9 and 10, there is shown in FIG. 8 an enlarged fragment plan view illustrating the cutting edge region of an insert generally indicated by the reference character 110 which has an enlarged and extended land which can be selectively removed to provide inserts of a variety of sizes, all accordingly to a process of this invention. In all other respects, the insert 110 has the same features as the insert 10, and therefore these features will not be set forth again in detail, but reference is invited to that portion of the specification which describes the insert 10. The insert body 112 of the insert 110 has a land 134 with an extended or flat land portion 135. The insert body 110 has an end wall 114 region, sides 118 and 120 and a cutting edge 126. The land region 134 extends rearwardly from the cutting edge 126 toward the peripheral wall 122 and defines a surface region of a predetermined area 138 and 139. The area 138 of the land 134 has a descending slope which is at an angle as described in conjunction with the embodiment of the insert as shown in FIGS. 6 and 7. The area 139 of the land 135 is generally flat and defines a cutting height surface "S" while the edge of the land opposite the area 139, adjacent the insert side 120, defines a cutting height line "L". The features of the descending wall 140, the planar floor 144 and the back ramp 160 are substantially similar to the wall 40, the planar floor 44 and the back ramp 60, which are described elsewhere herein.

As can be seen in FIG. 8, the land area 138 and land area 139 combine to define an overall width "A" of the cutting edge region 114. The land area 138 represents approximately two-thirds of the overall width as indicated at "B" while the land area 139 represents approximately one-third of the width of the end region as indicated at "C". Preferably, the flat land region 139 is no more than one-third of the total width of the cutting edge region of the insert after the grinding process which produces an insert with the desired final dimension. If the flat-land region 139 is larger than this preferred ratio, then during cutting operations the chip may not be adequately deformed and the advantages of the improved chip breaking feature of this invention not fully exploited. In this embodiment, the flat land 135 defines, in part, a selectively disposable portion of the cutting edge region of the insert body 112.

Figure 11:
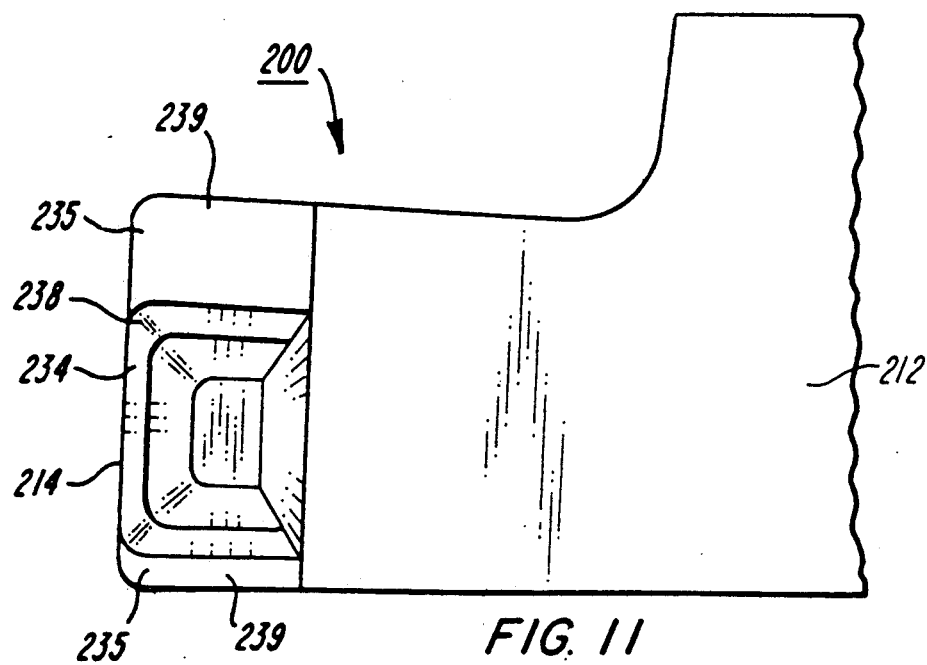
FIG. 11 is an enlarged fragment plan view illustrating the cutting edge region of an alternative embodiment of the insert of this invention, which insert has an asymmetrically disposed land in combination with an enlarged and extended flat land which can be selectively removed to provide inserts of a variety of sizes, all accordingly to a process of this invention.

While the land region 134 is shown in FIG. 8 to be located adjacent the cutting height line L, it is to be appreciated that the land 134, and associated descending wall, floor and back ramp can be disposed in a more central location or adjacent the opposite side 118 of the insert body 112. As illustrated in FIG. 11, an insert 200 includes a land 234 which is more centrally disposed in the cutting edge region of the insert body 212. Accordingly, the flat-land region 235 now comprises two separate regions on opposite sides of the land 234, with either one or both of the separate regions being modified through grinding operations during manufacture. In a configuration in which the land area 234 is disposed in the cutting edge region, the ratio of the width of land area 238 to the total width of the combined land areas 239 is preferably maintained as described above, so that the combined width of the two separate flat land regions 239 in the fully manufactured cutting insert 200 of this invention represents no more than approximately one-third of the width of the cutting edge region. The remaining portion or approximately two-thirds of the cutting edge region consists of the land 234.

It has been found that a portion of the at least one flat land region can be selectively removed by grinding whereby the overall width of the cutting edge is selectively reduced to a predetermined dimension. This extended width land area comprising the land and the flat land regions of the insert body as shown in FIGS. 8 and 11, permits the manufacture of a lesser number of unique individual insert sizes and the selective grinding of a portion of the flat land regions in order to achieve the desired dimensions for a particular insert style. As a result, fewer dies are necessary to manufacture a greater number of inserts having differing dimensions.

Figure 12:
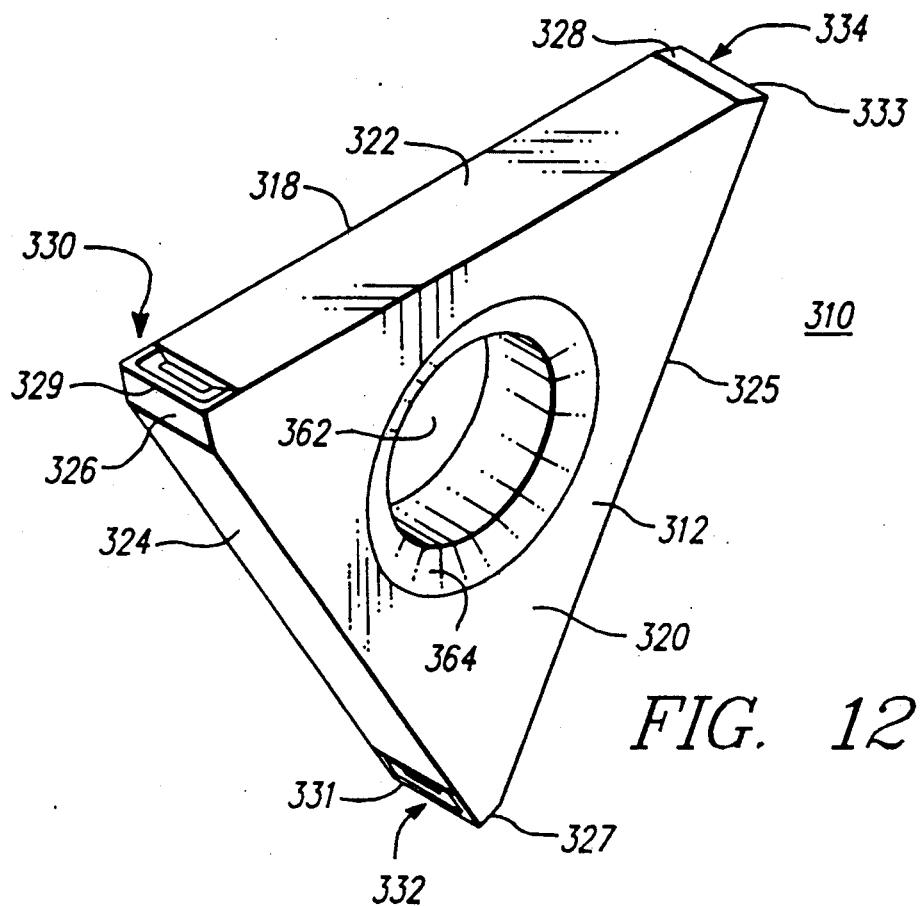
FIG. 12 is an isometric view of an on-edge triangle cutting insert configured for chip control according to the present invention.

What has been shown is a metalcutting insert having two peripheral sides which incorporate the chip control features described above. Other metalcutting insert geometries may also incorporate these chip control features. FIG. 12 shows a triangular cutting insert 310 with these features. The chip control features of insert 310 are the same features as those of insert 10, and therefore these features will not be set forth again in detail, but reference is invited to that portion of the specification which describes the chip control features of insert 10. The insert body 312 of the insert 310 is of a generally triangular configuration having a first side 318 which is generally parallel to a second side 320. The insert body 312 has a first peripheral wall 322, a second peripheral wall 324 and a third peripheral wall 325 between and generally perpendicular to the first side 318 and the second side 320. At the forward edges of each peripheral wall are a first cutting edge 329 which defines a first cutting edge region 330, a second cutting edge 331 which defines a second cutting edge region 332 and a third cutting edge 333 which defines a third cutting edge region 334.

While it would be possible to design the insert shown in FIG. 12 to be a purely triangular insert, that is having only three peripheral walls, since the cutting edge of the insert will be subjected to substantial forces, it is desirable to provide structural reinforcement to each cutting edge. For this reason fourth, fifth and sixth peripheral walls 326, 327, and 328 exist between the first three walls 322, 324 and 325, respectively.

It should be noted for optimum performance of the insert 310 the included angle between the first peripheral wall 322 and the fourth peripheral wall 326 should be 90 degrees or less. The same is true for the angle between walls 324 and 327 and the angle between walls 325 and 328.

In order to secure the insert 310 into a holder, an opening 362 extends from the first side 318 through the insert body 312 to the parallel second side 320. A bevel 364 may be provided at the opening 362 such that if a screw were used to secure the insert 310 to the holder the screw head may be flush with the side 320.

Figure 13:
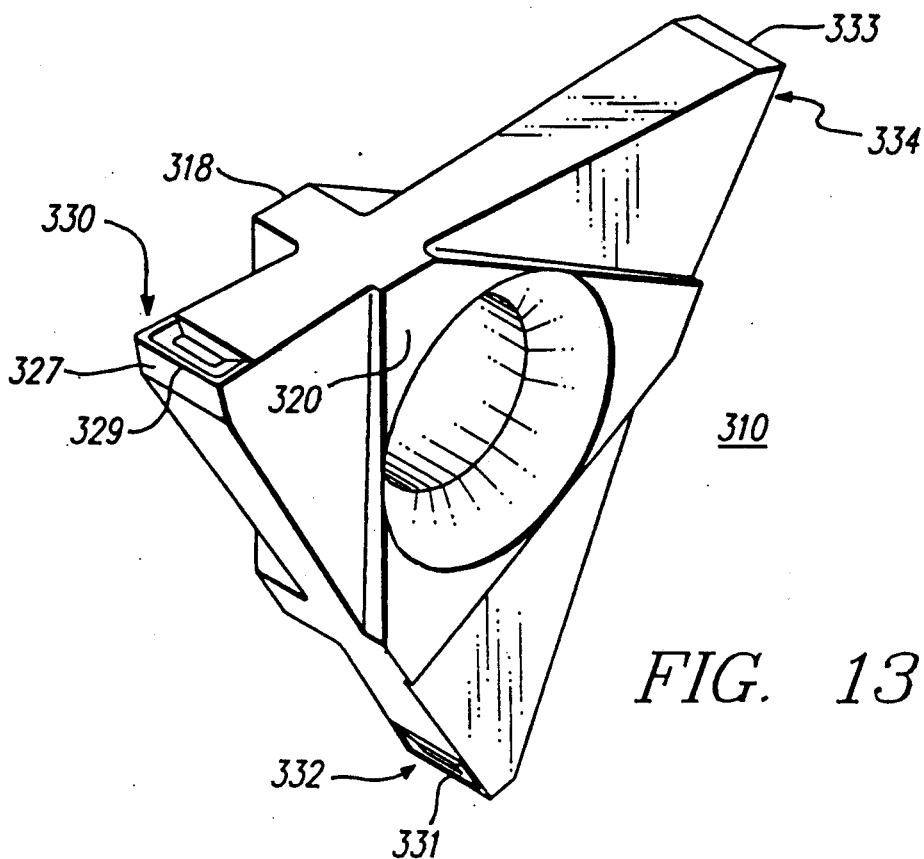
FIG. 13 is an isometric view of an on-edge triangle cutting insert having tapered sides and a flush surface for mounting.

While the insert 310 shown in FIG. 12 will be effective in grooving operations, to improve the efficiency of the cutting insert 310, it is desirable to taper portions of the first side 318 and second side 320 as shown in FIG. 13, such that the cutting edges 329, 331 and 333 are the widest portions of the insert 310 in the respective cutting edge regions 330, 332 and 334. By doing so during a cutting operation, contact of a workpiece by the sides of the insert is minimized, thereby minimizing unnecessary shear forces on these non-cutting sides of the insert. Furthermore, in order to properly mount the cutting insert 310, it is important to have planar surfaces of a known orientation. For this reason, substantial portions of first side 318 and second side 320 remain generally parallel. Except for the tapered wall portions, the cutting edge regions 330, 332 and 334 are identical to those shown in FIG. 12.

Figure 14:
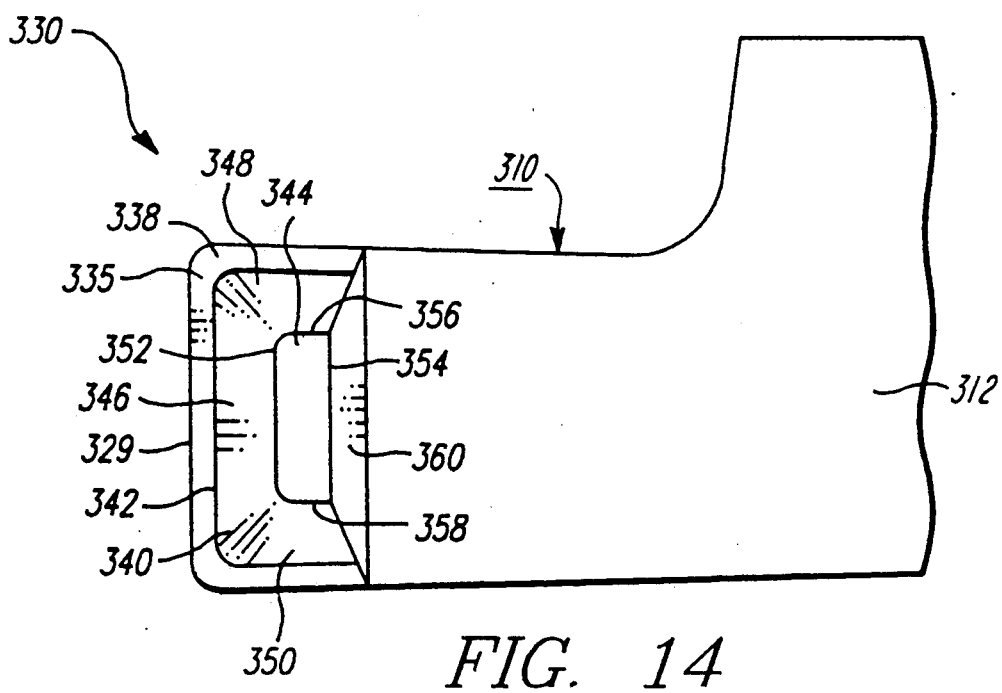
FIG. 14 is an enlarged fragment plan view illustrating the cutting edge region of an on-edge triangle insert, which has an enlarged and extended land which can be selectively removed to provide inserts of a variety of sizes.

Just as described for insert 10 in FIGS. 5 to 7, the insert body 312 in FIG. 14 includes a land region 335 extending rearwardly from the first cutting edge 329. The "land region" defines a surface region 338 of a predetermined width and area. It is to be appreciated that the insert 310 may be indexable, and therefore the detailed features described in conjunction with the first cutting edge region 330 of the insert may be present in the second cutting edge region 332 and the third cutting edge region 334.

Considering the first cutting edge region 330, a descending wall 340 initiates at an edge 342 of the land 335 and terminates in a planar floor region 344. The descending wall 340 has a forward portion 346 and opposed side portions 348 and 350. The planar floor region 344 has a forward edge 352, a rearward edge 354 and opposed side edges 356 and 358. The descending wall 340 terminates at the forward edge 352 and opposed side edges 356 and 358. A back ramp 360 extends upwardly from the planar floor rearward edge 354 and terminates at the first peripheral wall 322. As mentioned, the chip control features of the insert 310 are the same as those of insert 10 and therefore these features will not be set forth again in great detail. Reference is invited to that portion of the specification which describes the insert 10.

Figure 15:
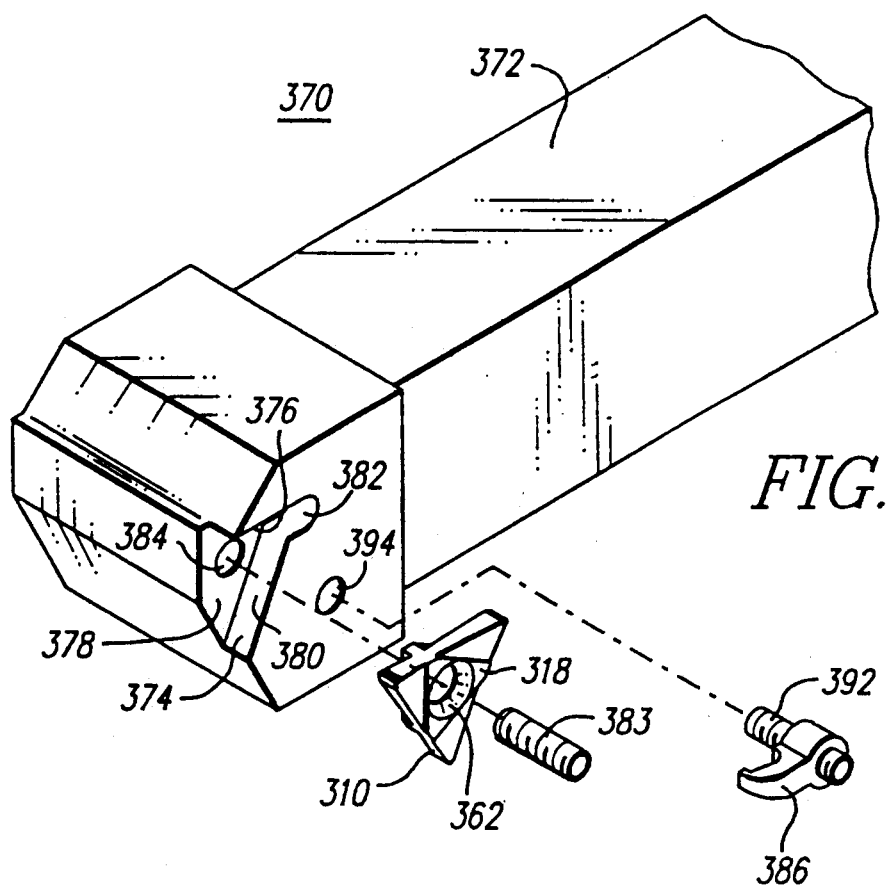
FIG. 15 is an exploded perspective view illustrating a typical holder and clamping arrangement for use in combination with an on-edge triangle cutting insert.

FIG. 15 shows an arrangement by which the insert 310 may be secured within a toolholder. The toolholder 370 is in the form of a member 372 adapted for being clamped in a tool support of any suitable type. At one end of the member 372, there is an insert pocket 374 having a top wall 376, a side wall 378 and a back wall 380. An undercut 382 is provided at the juncture of the top wall 376 and the back wall 380 in order to protect the cutting edge of the insert 310 which is disposed in that region in each clamped position of the insert 310. It will be noted that the top wall 376 and the side wall 378 of the insert pocket 374 are at right angles to each other, whereas the back wall 380 may be at a right angle to the side wall 378 but converges with the top wall 376 in the direction toward the back of the insert pocket 374. The insert pocket 374 is thereby adapted for receiving an insert 310 therein.

With the insert 310 positioned within the insert pocket 374 of the toolholder 370 a guide pin or screw 383 is positioned through the opening 362 of the insert 310 and secured within a threaded hole 384 in the member 372. The insert 310 may be further secured through the use of a clamp member 386 which is secured by a clamp screw 392 through the clamp member 386 and into a threaded hole 394 within the member 372. The clamp member 386 extends over the insert 310 such that the member 386 clamps the first side 318 of the insert 310.

Depending on the insert pocket 374 configuration and the insert 310 design, it may be necessary to provide a spacer between the insert 310 and the side wall 378 to provided spatial isolation of the cutting insert 310 from the toolholder 370. The insert 310, as shown in FIG. 13, has a side wall 318 of greater depth than side wall 320. It is possible to fabricate the cutting insert 310 such that a spacer is an integral part of the insert body 312. In this manner the depth of the wall 318 may be sufficient to act as a spacer, or in the alternative the depth may be minimized and the insert used in conjunction with a spacer positioned between the cutting insert and the side wall 378.

Figure 16:
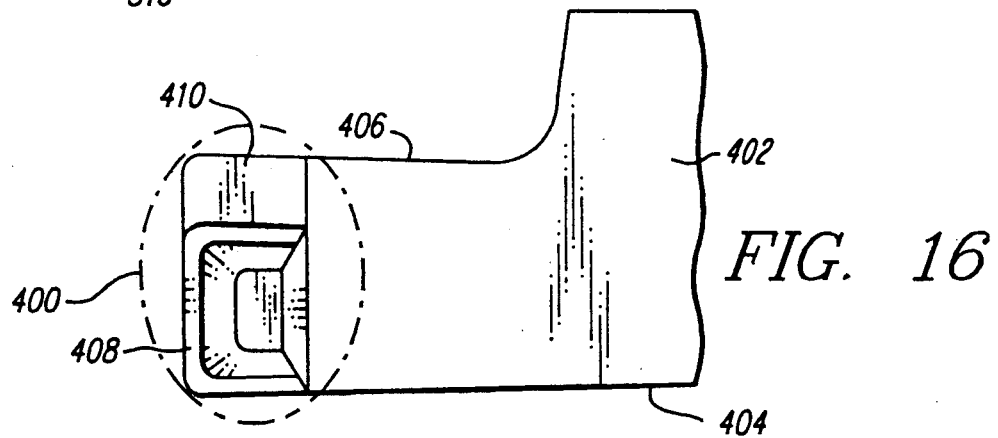
FIG. 16 is an enlarged fragment plan view illustrating the cutting edge region of an alternative embodiment of the on-edge triangle cutting insert, which has an asymmetrically disposed land in combination with an enlarged and extended flat land which can be selectively removed to provide inserts of a variety of sizes.

FIG. 16 shows the plan view of a cutting edge region 400 similar to the cutting edge regions 330, 332 and 334 shown in FIGS. 12 and 13. A peripheral wall 402 is shown bounded by a first generally parallel side 404 and a second generally parallel side 406. A first land region 408 is shown within the cutting edge region 400, however, unlike the cutting edge region in FIGS. 12 and 13, the region 400 also has a second land region 410. The enlarged and extended land in FIG. 16 can be selectively removed to provide inserts of a variety of sizes. In all other respects, this cutting edge region 400 has the same features as the first cutting edge region 330 discussed in FIGS. 12 and 13 and, therefore, these features will not be set forth again in detail but reference is invited to that portion of the specification which discusses the first cutting edge region 330.

Figure 17:
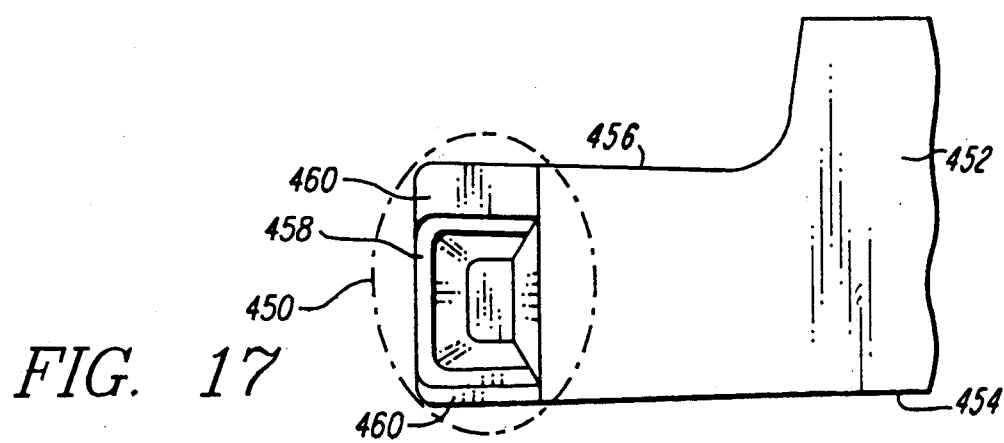
FIG. 17 is an enlarged fragment plan view illustrating the cutting edge region of an on-edge square cutting insert, which has an enlarged and extended land which can be selectively removed to provide inserts of a variety of sizes.

FIG. 17 illustrates a cutting edge region 450 having a peripheral wall 452 and a first generally parallel side 454 and second generally parallel side 456 similar to that of cutting edge region 400 shown in FIG. 16, however, the first land region 458 is now bounded by the second land region 460. Just as before, there is an enlarged and extended land which can be selectively removed to provide inserts of a variety of sizes. In all other respects, the cutting edge region 450 has the same features as the first cutting edge 330 discussed in FIGS. 12 and 13 and, therefore, these features will not be set forth again in detail, but reference is invited to that portion of the specification which describes the first cutting edge region 330.

Figure 18:
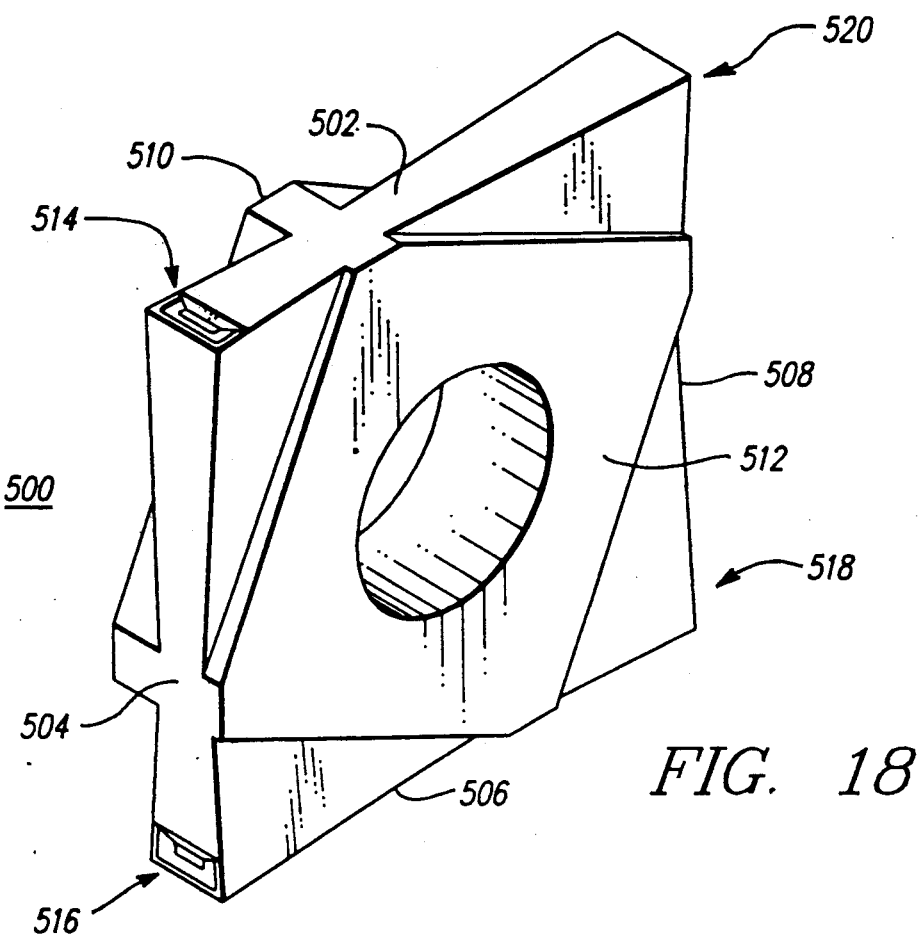
FIG. 18 is an isometric view of an on-edge square cutting insert configured for chip control.

The cutting insert 310 described in FIGS. 12 and 13 is oftentimes referred to as an on-edge triangle because of its generally triangular shape with cutting edges located on the edges of the insert. FIG. 18 shows an insert 500 having four peripheral walls 502, 504, 506 and 508 which are perpendicular to generally parallel first and second sides 510 and 512. Four cutting edge regions 514, 516, 518 and 520 are indicated on FIG. 18. The same features of the first cutting edge region 330 in FIG. 13 may apply to those features of the cutting edge regions 514, 516, 518 or 520.

Just as the cutting edge region 330 in FIGS. 12 and 13 is modified in FIGS. 16 and 17 to present a cutting edge region with enlarged or extended lands, so too may the cutting edge regions 514, 516, 518 or 520 in FIG. 18. The details of such modifications are identical to those shown in and discussed with FIGS. 16 and 17 and, as such, will not be discussed again. However, unlike the on-edge triangle design of FIGS. 12 and 13, the cutting edges of the on-edge square do not require additional reinforcement, such as the peripheral walls 326, 327 and 328 of FIG. 12. However, as with the on-edge triangle, for optimal performance, the included angle between adjacent peripheral walls 502, 504, 506 and 508 should be 90 degrees or less.

It should be noted at this point that the different cutting edge regions have been applied to different configurations in this specification and it should be obvious that these same cutting edge regions may be applicable to a variety of other cutting insert configurations.

FIG. 15 shows a toolholder 370 for a triangular insert 310. With modifications of the pocket 374 geometry to accept a square configuration, a toolholder similar in design to that shown in FIG. 15 could be utilized to hold the on-edge square insert 500 shown in FIG. 18.

Fabrication of the cutting inserts described in this application may be accomplished utilizing conventional pill pressing techniques coupled with EDM (Electrical Discharge Machining) or may be fabricated using injection molding techniques, both of which are known to a person of ordinary skill in the art. One such technique for thermoplastic molding of a sinterable silicon carbide composition may be found in U.S. Pat. No. 4,551,496, entitled "Thermoplastic Molding of Sinterable Silicon Carbide."

It has been found that a metal cutting insert incorporating the chip control features described herein provides significantly improved chip control over a wide variety of metalcutting conditions. What has been described is an improved cutting insert with chip control features and a method for the manufacture of such cutting inserts.

What is claimed is:

1. An improved cutting insert with chip control features comprising an insert body having
   a) first and second generally parallel sides;
   b) peripheral walls between and generally perpendicular to said sides with at least one pair of adjacent peripheral walls forming an included angle of 90 degrees or less with one another;
   c) at least one cutting edge region, each region having a predetermined width and located at a juncture of a pair of adjacent peripheral walls forming an included angle of 90 degrees or less with each other, each cutting edge region comprising
      i) a cutting edge at the juncture of the pair of adjacent peripheral walls;
      ii) a land region extending rearwardly along one of the pair of adjacent peripheral walls from the cutting edge and defining a land surface of a predetermined width, said land region being asymmetrically disposed in the cutting edge region;
      iii) a descending wall having a forward portion and opposed side portions, initiating in a portion of said land surface and terminating in a planar floor region having a forward, a rearward and opposed side edges wherein said descending wall terminates at said planar floor's forward and opposed side edges and;
      iv) a back ramp ascending from said planar floor rearward edge, intersecting said descending wall opposed side portions and terminating at said land surface; and v) a first flat land region of predetermined width adjacent said land region and extending rearwardly from a further portion of said cutting edge and said first flat land region together with said land region defines the width of the cutting edge region and wherein the first flat land region width is no more than approximately one-third of said cutting edge region width;

wherein said insert body is adapted for mounting in a holder with one cutting edge positioned in the holder for cutting operations.

2. The improved cutting insert of claim 1 wherein in the region of each cutting edge the generally parallel sides are tapered with distance from the cutting edge.

3. The improved cutting insert of claim 1 wherein there are at least two pairs of adjacent peripheral walls forming an included angle of 90 degrees or less between the walls of each pair and wherein said insert body is indexable about an axis perpendicular to said insert sides, such that in each indexed position of said insert body a respective cutting edge is positioned in the holder for cutting operations.

4. The improved cutting insert of claim 3 wherein said insert body has an opening about an axis perpendicular to said insert sides extending through the sides through which the insert may be secured in a holder.

5. The improved cutting insert of claim 3 wherein the cutting insert is an on-edge triangle.

6. The improved cutting insert of claim 3 wherein the cutting insert is an on-edge square.

7. The improved cutting insert according to claim 3 wherein the cutting edge region further includes a second flat land region extending rearwardly from a further portion of the cutting edge adjacent the land region and opposite the first flat land region with the portion of one of the first or second flat land regions proximate one opposed side edge of said land region being of a greater width than the other of the first or second flat land region proximate the other opposed side edge of the land region.

8. The improved cutting insert according to claim 7 wherein the flat land region proximate one opposed side of the land region which is of a greater width than the flat land region proximate the other opposed side defines in part at least one selectively disposable portion of said cutting edge region, whereby the overall width of the cutting edge region is reducible by the selective removal of at least a portion of the at least one selectively disposable portion.

9. An improved cutting insert with chip control features comprising an insert body having
a) first and second generally parallel sides;
b) peripheral walls between and generally perpendicular to said sides with at least one pair of adjacent peripheral walls forming an included angle of 90 degrees or less with one another;
c) at least one cutting edge region, each region having a predetermined width and located at a juncture of a pair of adjacent peripheral walls forming an included angle of 90 degrees or less with each other, each cutting edge region comprising
i) a cutting edge at the juncture of the pair of adjacent peripheral walls;
ii) a land region extending rearwardly along one of the pair of adjacent peripheral walls from the cutting edge and defining a land surface of a predetermined width, said land region being asymmetrically disposed in the cutting edge region;
iii) a descending wall having a forward portion and opposed side portions, initiating in a portion of said land surface and terminating in a planar floor region having a forward, a rearward and opposed side edges wherein said descending wall terminates at said planar floor's forward and opposed side edges and;
iv) a back ramp ascending from edge, intersecting said descending wall opposed side portions and terminating at said land surface; and
v) a first flat land region of predetermined width adjacent said land region and extending rearwardly from a further portion of said cutting edge; said first flat land region defining in part a selectively disposable portion of said end wall region, whereby the overall width of said end wall region is reducible by the selective removal of at least a portion of the selectively disposable first flat land region of said end wall region;

wherein said insert body is adapted for mounting in a holder with one cutting edge positioned in the holder for cutting operations.

10. The improved insert of claim 9 wherein in the region of each cutting edge the generally parallel sides are tapered with distance from the cutting edge.

11. The improved insert of claim 9 wherein there are at least two pairs of adjacent peripheral walls forming an included angle of 90 degrees or less between the walls of each pair and wherein said insert body is indexable about an axis perpendicular to said insert sides, such that in each indexed position of said insert body a respective cutting edge is positioned in the holder for cutting operations.

12. The improved cutting insert of claim 11 wherein said insert body has an opening about an axis perpendicular to said insert sides extending through the sides through which the insert may be secured in a holder.

13. The improved cutting insert of claim 11 wherein the cutting insert is an on-edge triangle.

14. The improved cutting insert of claim 11 wherein the cutting insert is an on-edge square.

15. The improved cutting insert according to claim 11 wherein the land region has a surface of a predetermined width and said first flat land region is of a predetermined width which define in combination the width of the cutting edge region and wherein the first flat land region width is no more than approximately one-third of said cutting edged region width.

16. The improved cutting insert according to claim 15 wherein the end wall region further includes a second flat land region adjacent the land region and said land region is asymmetrically disposed in the end wall region such that the portion of the first flat land region proximate one opposed side edge of said land region is of a different dimension than the portion of the second land region proximate the other opposed side edge of the land region.

17. The improved cutting insert according to claim 15 wherein the back ramp ascends from the rearward edge of the floor towards the land surface at an angle of between about 30 to 50 degrees relative to the peripheral wall associated with the land region.

18. The improved cutting insert according to claim 17 wherein the back ramp ascends from the rearward edge of the floor towards the land surface at an angle of approximately 40 degrees relative to the peripheral wall associated with the land region.

19. The improved cutting insert according to claim 15 wherein the descending wall portion proximate the forward edge of the planar floor descends at an angle of between about 15 to 21 degrees with respect to the planar floor.

20. The improved cutting insert according to claim 19 wherein the descending wall portion proximate the forward edge of the planar floor descends at an angle of approximately 18 degrees with respect to the planar floor.

21. The improved cutting insert according to claim 15 wherein the land region proximate the cutting edge slopes downwardly toward the descending wall at an angle of between about 5 to 15 degrees with respect to the peripheral wall associated with the land region.

22. The improved cutting insert according to claim 21 wherein the land region proximate the cutting edge slopes downwardly toward the descending wall at an angle of approximately 10 degrees with respect to the peripheral wall associated with the land region.

* * * * *